United States Patent [19]

Caronia et al.

[11] Patent Number: 5,575,965
[45] Date of Patent: Nov. 19, 1996

[54] PROCESS FOR EXTRUSION

[75] Inventors: Paul J. Caronia, Annandale; Salvatore F. Shurott, South River, both of N.J.

[73] Assignee: Union Carbide Chemicals & Plastics Technology Corporation, Danbury, Conn.

[21] Appl. No.: 445,140

[22] Filed: May 19, 1995

[51] Int. Cl.$^6$ .................................................. B29C 47/02
[52] U.S. Cl. .................... 264/171.17; 264/1.28; 264/1.29; 264/171.18; 264/171.23; 264/331.15; 264/331.17; 425/113; 425/133.1
[58] Field of Search ............... 264/171.17, 171.23, 264/331.17, 331.15, 1.28, 1.29, 171.16, 171.18; 425/113, 114, 133.1

[56] References Cited

U.S. PATENT DOCUMENTS

| | | | |
|---|---|---|---|
| 4,339,507 | 7/1982 | Kurtz et al. | 264/171.14 |
| 4,364,981 | 12/1982 | Homer et al. | 428/35 |
| 4,399,173 | 8/1983 | Anthony et al. | 428/35 |
| 4,622,199 | 11/1986 | Hirschberger | 425/133.1 |
| 4,713,205 | 12/1987 | Su | 264/176.1 |
| 4,859,398 | 8/1989 | Su | 264/176.1 |
| 4,937,299 | 6/1990 | Ewen et al. | 526/119 |
| 4,948,543 | 8/1990 | Pawlowski et al. | 264/169 |
| 5,026,594 | 6/1991 | Akao | 428/220 |
| 5,312,578 | 5/1994 | Aladenize et al. | 264/331.17 |
| 5,317,036 | 5/1994 | Brady, III et al. | 523/223 |
| 5,320,798 | 6/1994 | Chambon et al. | 425/461 |
| 5,342,907 | 8/1994 | Cann et al. | 526/129 |
| 5,344,714 | 9/1994 | Su | 428/516 |
| 5,409,646 | 4/1995 | Menon et al. | 264/331.17 |

*Primary Examiner*—Jeffery R. Thurlow
*Attorney, Agent, or Firm*—Saul R. Bresch

[57] ABSTRACT

A process for the co-extrusion of an inner layer around a conductive medium and an outer layer around the inner layer including:

(i) introducing into an extruder adapted for profile coextrusion, a preformed conductive medium; an inner layer formulation including a homogeneous polyethylene having a polydispersity in the range of about 1.5 to about 3.5 and an essentially uniform comonomer distribution, and an organic peroxide; and an outer layer formulation including (A) one of (a) a copolymer of ethylene and an unsaturated ester; (b) or a polyethylene having a polydispersity greater than about 4.0 and a density of at least 0.916 gram per cubic centimeter, said polymer made by a high pressure process; or (c) a heterogeneous copolymer of ethylene and one or more alpha-olefins having a density of less than 0.916 gram per cubic centimeter, a melt index of at least about 4 grams per 10 minutes, and a polydispersity greater than about 4.0, and, (B) optionally, an organic peroxide; and (ii) co-extruding said formulations around the conductive medium at a temperature no higher than about 160 degrees C.

6 Claims, No Drawings

PROCESS FOR EXTRUSION

TECHNICAL FIELD

This invention relates to a process for co-extrusion over an electrical conductor or communications medium in which the extrudate is essentially free of melt fracture.

BACKGROUND INFORMATION

Polyethylene, during processing operations such as extrusion, is known to experience a phenomenon described as melt fracture in which, upon exiting the extruder die, the extrudate has a highly irregular surface. The irregular surface is rough, and it does not have a consistent surface for fabricating a quality finished article or for producing an aesthetically pleasing article. Linear polyethylenes such as LLDPE (linear low density polyethylene) and VLDPE (very low density polyethylene), due to an inherent molecular structure/melt rheology characteristic, are highly susceptible to melt fracture while highly branched polyethylene such as LDPE (low density polyethylene) is significantly less prone to melt fracture. With high molecular weight (low melt index), narrow molecular weight distribution, narrow (uniform) comonomer distribution linear polyethylene, the melt fracture phenomenon is especially severe under relatively low temperature extrusion conditions such as temperatures below 160 degrees C., ranging as low as about 100 degrees C.

Conventional techniques for the elimination of melt fracture are to raise the process temperature thus reducing the polymer's viscosity, which results in a corresponding lower shear strain at the die; to decrease the output rate thus decreasing the shear rate and corresponding shear strain at the die; or to increase the die shear rate thus increasing the polymer's viscous energy generation to raise the localized melt temperature for an effect similar to raising the process temperature. These techniques reduce the viscosity of the polymer and the resulting melt fracture. However, there are deficiencies in these techniques that make them unacceptable for processing materials under low temperature processing conditions, i.e., temperatures below 160 degrees C.

The requirement for processing temperatures of less than 160 degrees C. is desirable when extruding a resin formulation containing an organic peroxide, a thermally sensitive additive. When extruding a polyethylene formulation containing an organic peroxide, raising the process temperature is not a desired option to eliminate melt fracture in view of the problem of scorch, i.e., premature crosslinking caused by the decomposition of the organic peroxide. Decreasing the output rate is also not desirable because it increases the cost of manufacturing the extrudate product. Finally, increasing the die shear rate is similar in effect to raising the melt temperature with the attendant scorch.

Another approach to addressing the melt fracture phenomenon is to redesign the process equipment; however, this involves designing equipment for a specific molecular weight resin which limits the usefulness of the equipment, and, of course, raises the cost. Incorporating processing aid additives is another approach, but this is expensive and may affect other product properties. Blending a lower molecular weight polymer with a relatively high molecular weight polymer has the disadvantage that it typically results in a product with properties inferior to the high molecular weight product's properties.

Co-extrusion methods have also been employed to overcome melt fracture, but these methods have been generally applied to tubular blown film processes rather than extrusion around wire or glass fibers, for example. And these blown film processes have been conducted at temperatures considerably higher than 160 degrees C. with resin formulations, which do not include peroxides. Further, the polyethylene resins used in these blown film processes have been of the heterogeneous type, which are not as susceptible to the melt fracture phenomenon.

DISCLOSURE OF THE INVENTION

An object of this invention, therefore, is to provide a process for the extrusion of a homogeneous polyethylene formulation containing an organic peroxide around a conductive medium wherein the extrudate is essentially free of melt fracture. Other objects and advantages will become apparent hereinafter.

According to the invention, a process has been discovered, which meets the above object.

The process is one for the co-extrusion of an inner layer around a conductive medium and an outer layer around the inner layer comprising:

(i) introducing into an extruder adapted for profile coextrusion, a preformed conductive medium; an inner layer formulation comprising a homogeneous polyethylene having a polydispersity in the range of about 1.5 to about 3.5 and an essentially uniform comonomer distribution, and an organic peroxide; and an outer layer formulation comprising (A) one of (a) a copolymer of ethylene and an unsaturated ester; or (b) a polyethylene having a polydispersity greater than about 4.0 and a density of at least 0.916 gram per cubic centimeter, said polymer made by a high pressure process; or (c) a copolymer of ethylene and one or more alpha-olefins having a density of less than 0.916 gram per cubic centimeter, a melt index of at least about 4 grams per 10 minutes, and a polydispersity greater than about 4.0, and, optionally, an organic peroxide; and (ii) co-extruding said formulations at around the conductive medium a temperature no higher than about 160 degrees C.

DESCRIPTION OF THE PREFERRED EMBODIMENT(S)

A profile extrusion process is one in which an extrudate having a structural profile such as wire insulation or cable jacketing is prepared. A structural profile typically involves a shaped viscous melt exiting a forming die followed by cooling. The conductive medium can be an electrical conductor, a core made up of two or more electrical conductors, or a fiber optic communications medium made up of one or more glass fibers formed into a glass core. The extruder is described below. The term "extruder", in the context of this specification, means one or more extruders with the attendant apparatus required for the co-extrusion of polymer formulations around a conductive medium such as a wire or glass fiber.

The inner layer extruded around the conductive medium is a homogeneous polyethylene formulation. The thickness of the inner layer is generally in the range of about 30 to about 300 mils. Homogeneous polyethylenes are copolymers of ethylene, one or more alpha-olefins, and, optionally, a diene. The alpha-olefins can have 3 to 12 carbon atoms, and preferably have 3 to 8 carbon atoms. Examples of the alpha-olefins are propylene, 1-butene, 1-hexene, 4-methyl- 1pentene, and 1-octene. The dienes can have about 4 to 20 carbon atoms. Examples of the dienes are 1,4-pentadiene, 1,3-hexadiene, 1,5-hexadiene, 1,4-octadiene, 1,4-hexadiene, dicyclopentadiene, and ethylidene norbornene. As noted above, these homogeneous polyethylenes have a polydispersity (Mw/Mn) in the range of about 1.5 to about 3.5 and an essentially uniform comonomer distribution. The homogeneous polyethylenes are characterized by single and relatively low DSC melting points. Heterogeneous polyethylenes (the more common of the two), on the other hand, have a polydispersity (Mw/Mn) greater than 3.5 and do not have a uniform comonomer distribution. Mw is defined as weight average molecular weight and Mn is defined as number average molecular weight. The homogeneous polyethylenes can have a density in the range of 0.860 to 0.930 gram per cubic centimeter, and preferably have a density in the range of 0.870 to about 0.920 gram per cubic centimeter. They also can have a melt index in the range of about 0.5 to about 30 grams per 10 minutes, and preferably have a melt index in the range of about 0.5 to about 5 grams per 10 minutes.

Homogeneous polyethylenes can be prepared, for example, with vanadium based catalysts such as those described in U.S. Pat. Nos. 5,332,793 and 5,342,907, and they can also be prepared with single site metallocene catalysts such as those described in U.S. Pat. Nos. 4,937,299 and 5,317,036.

The outer layer surrounding the inner layer is a formulation containing one of three different polymers. The first polymer (a) is an ethylene polymer prepared by conventional high pressure processes. These polymers are highly branched with a good deal of long chain branching. The ethylene polymer can be a copolymer of ethylene and an unsaturated ester such as vinyl acetate, ethyl acrylate, methyl acrylate, methyl methacrylate, t-butyl acrylate, n-butyl acrylate, n-butyl methacrylate, 2-ethylhexyl acrylate, and other alkyl acrylates. The unsaturated ester can have 4 to 20 carbon atoms, preferably no more than 12 carbon atoms. The unsaturated ester can be present in the copolymer in an amount of about 5 to about 40 percent by weight, and preferably 10 to about 35 percent by weight, based on the weight of the copolymer. The density of the copolymer can be in the range of 0.916 to 0.940 gram per cubic centimeter, and is preferably in the range of 0.925 to 0.935 gram per cubic centimeter. The melt index can be in the range of about 5 to about 100 grams per 10 minutes, and is preferably in the range of about 8 to about 70 grams per 10 minutes.

The outer layer can also be made up of a formulation containing polymer (b), a high pressure polyethylene, usually a homopolymer of ethylene, prepared for example by the high pressure process described in Introduction to Polymer Chemistry, Stille, Wiley and Sons, N.Y., 1962, at pages 149 to 151. The density of the homopolymer can be in the range of 0.916 to 0.930 gram per cubic centimeter, and is preferably in the range of 0.920 to 0.928 gram per cubic centimeter. The melt index can be in the range of about 1 to about 10 grams per 10 minutes, and is preferably in the range of about 2 to about 5 grams per 10 minutes. Melt index is determined in accordance with ASTM D-1238, Condition E, measured at 190 degrees C.

Finally, the outer layer can be made up of a formulation containing polymer (c), which can be referred to as very low density polyethylene (VLDPE). This polymer has a density of less than 0.916 gram per cubic centimeter. The density can be as low as 0.860 gram per cubic centimeter. The VLDPE can be made by conventional low pressure processes such as those mentioned in U.S. Pat. Nos. 4,302,565 and 4,508,842. VLDPE is a copolymer of ethylene and one or more alpha-olefins, each having 3 to 12 carbon atoms, and preferably 3 to 8 carbon atoms. Examples of the alpha-olefins are propylene, 1-butene, 1-hexene, 4-methyl-1-pentene, and 1-octene.

The polydispersity (Mw/Mn) of the outer layer polymer can be at least about 4, and is preferably in the range of about 4.5 to about 10.

The outer layer is generally at least about 5 mils in thickness, and for wire and cable applications is preferably at least about 15 mils in thickness. The upper limit of thickness is just a matter of economics, the lower the upper limit, the more economical it is to provide same.

Conventional additives, which can be introduced into either formulation, are exemplified by antioxidants, coupling agents, ultraviolet absorbers or stabilizers, antistatic agents, pigments, dyes, nucleating agents, reinforcing fillers or polymer additives, resistivity modifiers such as carbon black, slip agents, plasticizers, processing aids, lubricants, viscosity control agents, tackifiers, anti-blocking agents, surfactants, extender oils, metal deactivators, voltage stabilizers, flame retardant fillers and additives, crosslinking boosters and catalysts, and smoke suppressants. Fillers and additives can be added to the outer layer formulation in amounts ranging from less than about 0.1 to more than about 200 parts by weight for each 100 parts by weight of the base resin. Fillers and additives can be added to the inner layer formulation in mounts ranging from less than about 0.1 to no more than about 5 parts by weight for each 100 parts by weight of base resin.

Examples of antioxidants are: hindered phenols such as tetrakis[methylene(3,5-di-tert-butyl-4-hydroxyhydrocinnamate)]-methane, bis[(beta-(3,5-di-tert-butyl-4-hydroxybenzyl)methylcarboxyethyl)]sulphide, 4,4'-thiobis(2-methyl-6-tertbutylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenylphosphorrite; thio compounds such as dilaurylthiodipropionate, dimyristylthiodipropionate, and distearylthiodipropionate; various siloxanes; and various amines such as polymerized 2,2,4-trimethyl-1,2-dihydroquinoline. Antioxidants can be used in amounts of about 0.1 to about 5 parts by weight per 100 parts by weight of polyethylene.

As noted above, the low temperature additives, which create the problem of scorch at extrusion temperatures above about 160 degrees C., are organic peroxides. These organic peroxides can be used to crosslink the polyethylene resins. They are one component of the inner layer formulation and are an optional component of the outer layer formulation. The organic peroxides are conventional and are used in conventional amounts. Examples of organic peroxides are as follows (the decomposition temperature in degrees C. is given in parentheses): succinic acid peroxide (110), benzoyl peroxide (110), t-butyl peroxy-2-ethylhexanoate (113), p-chlorobenzoyl peroxide (115), t-butyl peroxyisobutyrate (115), t-butyl peroxyisopropyl carbonate (135), t-butyl peroxylaurate (140), 2,5-dimethyl-2,5-di(benzoyl peroxy)hexane (140), t-butyl peroxyacetate (140), di-t-butyl peroxyphthalate (140), t-butyl peroxymaleate (140), cyclohexanone peroxide (145), t-butyl peroxybenzoate (145), dicumyl peroxide (150), 2,5-dimethyl- 2,5-di(t-butyl peroxy)hexane-3- (155), t-butyl cumyl peroxide (155), t-butyl hydroperoxide (158), and di-t-butyl peroxide (160). Dicumyl peroxide is preferred.

The co-extrudate, which is the product of the process of this invention, can be prepared in various types of extruders provided that they are adapted for co-extrusion. Compounding can be effected in the extruder or prior to extrusion in a conventional mixer such as a Brabender™ mixer or a Banbury™ mixer. Various extruders and processes for profile extrusion are described in U.S. Pat. Nos. 4,814,135; 4,857,600; 5,076,988; and 5,153,382. All types of single screw and twin screw extruders and polymer melt pumps and extrusion processes will generally be suitable in effecting the process of this invention. A typical extruder, commonly referred to as a fabrication extruder will have a solids feed hopper at its upstream end and a melt forming die at its downstream end. The hopper feeds unfluxed plastics into the feed section of a barrel containing the processing screw(s) that flux and ultimately pump the plastic melt through the forming die. At the downstream end, between the end of the screw and the die, there is often a screen pack and a breaker plate. Fabrication extruders typically accomplish the mechanisms of solids conveying and compression, plastics fluxing, melt mixing and melt pumping although some two stage configurations use a separate melt fed extruder or melt pump equipment for the melt pumping mechanism. Extruder barrels are equipped with barrel heating and cooling features for startup and improved steady state temperature control. Modern equipment usually incorporates multiple heating/cooling zones starting at the rear feed zone and segmenting the barrel and downstream shaping die. The length to diameter ratio of each barrel is in the range of about 15:1 to about 30:1. In a wire coating process, after passing through the breaker plate, the extrudate is pumped through a melt flow channel into a crosshead that reorients the polymer flow typically by 90 degrees such that it is directed to uniformly coat the conductor. In a wire coating extrusion process in which multiple material layers are applied to the conductor, the molten polymer from each extruder is independently pumped into a crosshead that is designed to coat the wire or conductor such that the different material layers are distinct, i.e., the material layers are not mixed in the crosshead. The multiple layer crosshead can be designed such that the multiple material layers coat the conductor simultaneously or in a discrete manner. In wire coating applications where the material is crosslinked after extrusion, the die of the crosshead feeds directly into a heating zone, and this zone can be maintained at a temperature in the range of about 145° C. to about 455° C., and preferably in the range of about 200° C. to about 400° C. These temperature ranges cover steam cure vulcanization processes that typically operate at around 204° C. and dry cure vulcanization processes that typically operate at around 400° C.

The advantages of the invention lie in the essential elimination of melt fracture in the inner layer even though the coextrusion process is run at temperatures of less than about 160 degrees C. and the inner layer formulation contains a narrow molecular weight distribution and essentially uniform comonomer distribution (homogeneous) polyethylene. Further, where a strippable outer layer is provided, removal or stripping of the outer layer leaves an inner layer, which becomes the outer layer, with essentially no melt fracture.

The patents mentioned in this specification are incorporated by reference herein.

The invention is illustrated by the following examples.

EXAMPLES 1 to 39

The apparatus used in the examples and its operation are described as follows. In those examples where there is only a single layer, the inner layer extruder is used, and the additional apparatus, which is necessary to effect the co-extrusion is not used.

The extruder used for extruding the inner layer is a 2.5 inch, 20:1 L/D (length to diameter) single screw plasticating extruder manufactured by John Royle Company. It contains within its barrel a short lead polyethylene screw with a Maddock™ mixing section for plasticating the polymer. The extruder used for extruding the outer layer is a 1.5 inch, 24:1 L/D single screw plasticating extruder manufactured by Sterling Company. This extruder also contains within its barrel a polyethylene metering screw for plasticating the polymer. The molten polymers from each extruder are fed into a dual layer wire coating crosshead manufactured by Canterbury Engineering Company. A wire coating line in which #14 AWG (American Wire Guide) solid copper wire having a diameter of 0.064 inch is taken off a shipping reel by a wire payoff through a wire metering capstan through the dual layer wire coating crosshead in which the wire is coated with molten polymer. The crosshead utilizes a guider tip with a hole diameter of 0.067 inch for guiding the wire into contact with the molten polymer coming from the 2.5 inch extruder followed by contact with the molten polymer from the 1.5 inch extruder. The wire, now coated with inner and outer layers of polymer, is drawn through a die with an opening of 0.260 inch. The polymer coated wire is then drawn through a downstream vulcanization tube and water bath by a pullout capstan. Between the water bath and the capstan, a laser micrometer is positioned to measure the coated wire's outside diameter.

Melt fracture is determined by visually examining the coated wire. Each coated wire is given a value from 1 to 9 with the value 1 being the worst case of melt fracture and the value 9 representing essentially no melt fracture as follows:

1=severely gross

2=gross

3=gross shark skin

4=severe shark skin

5=shark skin

6=rough surface

7=slightly rough surface

8=minor imperfection, but acceptable

9=essentially no melt fracture

Components used in the examples:

1. Polymer A is a homogeneous copolymer of ethylene and 1-octene wherein the 1-octene is present in an amount of 24 percent by weight based on the weight of the polymer. The polymer has a melt index of 5 gram per 10 minutes; a density of 0.87 gram per cubic centimeter; an Mw/Mn of 2; an essentially uniform comonomer distribution; and is prepared with a metallocene catalyst.

2. Polymer B is a homogeneous copolymer of ethylene and 1-octene wherein the 1-octene is present in an amount of 24 percent by weight based on the weight of the polymer. The polymer has a melt index of 5 grams per 10 minutes; a density of 0.87 gram per cubic centimeter; an Mw/Mn of 2; an essentially uniform comonomer distribution; and is prepared with a metallocene catalyst.

3. Polymer C is a heterogeneous copolymer of ethylene and 1-hexene wherein the 1-hexene is present in an amount of 16 to 20 percent by weight based on the weight of the polymer. The polymer has a melt index of 4 grams per 10 minutes; a density of 0.905 gram per cubic centimeter; an Mw/Mn of 4.5; and is prepared with a magnesium/titanium catalyst.

4. Polymer D is a homopolymer of ethylene prepared by a high pressure process. The polymer has a melt index of 2 grams per 10 minutes; a density of 0.923 gram per cubic centimeter; an Mw/Mn of 5.2.

5. Polymer E is a copolymer of ethylene and ethyl acrylate wherein the ethyl acrylate is present in an amount of 15 to 25 percent by weight based on the weight of the copolymer. It is prepared by a high pressure process. The polymer has a melt index of 20 grams per 10 minutes.

6. Polymer F is a copolymer of ethylene and vinyl acetate wherein the vinyl acetate is present in an amount of 28 to 38 percent by weight based on the weight of the copolymer. It is prepared by a high pressure process. The polymer has a melt index of 35 grams per 10 minutes.

7. Formulation A is a melt blended mixture of 100 parts by weight Polymer A; 0.18 part by weight antioxidant A; 0.18 part by weight DSTDP; and 1.8 parts by weight dicumyl peroxide.

8. Formulation C is a melt blended mixture of 100 parts by weight Polymer C; 0.35 part by weight antioxidant A; 0.35 part by weight DSTDP; and 1.8 parts by weight dicumyl peroxide.

9. Formulation D is a melt blended mixture of 100 parts by weight Polymer D; 0.18 part by weight antioxidant A; and 0.18 part by weight DSTDP.

10. Formulation E is a melt blended mixture of 100 parts by weight Polymer E; 30+ parts by weight conductive carbon black; antioxidant B; and dicumyl peroxide.

11. Formulation F is a melt blended mixture of 100 parts by weight Polymer F; 20+ parts by weight conductive carbon black; antioxidant B; and dicumyl peroxide. It is designed to have a low adhesion to polyethylene such that it can easily be removed from a polyethylene inner layer.

12. Processing Aid A is a copolymer of vinylidene fluoride and hexafluoropropylene.

13. Processing Aid B is a mixture containing 80 percent by weight Processing Aid A and 20 percent by weight polyethylene.

14. DSTDP is distearylthiodipropionate.

15. Antioxidant A is thiodiethylene bis(3,5-di-tert-butyl-4-hydroxyhydrocinnamate).

16. Antioxidant B is an Agerite™ MA acetone-aniline condensation product.

The variables and the results are set forth in the following Table. The temperature range for each extruder reflects the high and low temperatures of the temperatures measured at each of the four heating zones, the flange, the head, and the die.

Note: where the polymer is mentioned instead of a formulation, it will be understood that the polymer is being used in the "as received" condition from the manufacturer. This means that the polymer contains calcium stearate and may contain other additives, usually stabilizers. The total amount of additives, however, is no greater than about 1 part per 100 parts of polymer. In any case, 1.8 parts by weight of dicumyl peroxide per 100 parts by weight of polymer is present.

TABLE

| example | 1 | 2 | 3 | 4 | 5 | 6 | 7 | 8 | 9 | 10 |
|---|---|---|---|---|---|---|---|---|---|---|
| single layer polymer | A | A | A | A | A | A | A | A | A | A |
| single layer operating conditions: | | | | | | | | | | |
| temperature range (°C.) | 123 to 143 | 123 to 142 | 123 to 142 | 123 to 141 | 112 to 130 | 112 to 130 | 112 to 128 | 112 to 130 | 99 to 119 | 99 to 120 |
| revolutions per minute | 7 | 14 | 14 | 14 | 7 | 14 | 14 | 14 | 7 | 14 |
| feet per minute | 15 | 33 | 20 | 10 | 15 | 33 | 20 | 10 | 15 | 33 |
| melt temperature (°C.) | 150 | 154 | 156 | 156 | 138 | 141 | 143 | 144 | 126 | 131 |
| extrudate wall thickness (inch): | | | | | | | | | | |
| minimum | 0.070 | 0.069 | 0.098 | 0.145 | 0.062 | 0.067 | 0.105 | 0.146 | 0.078 | 0.058 |
| maximum | 0.083 | 0.091 | 0.103 | 0.153 | 0.088 | 0.094 | 0.116 | 0.156 | 0.156 | 0.103 |
| melt fracture: single layer | 2 | 1 | 4 | 5 | 1 | 1 | 3 | 5 | 1 | 1 |

| example | 11 | 12 | 13 | 14 | 15 | 16 | 17 | 18 | 19 | 20 |
|---|---|---|---|---|---|---|---|---|---|---|
| single or inner layer polymer (*) or formulation (**) | A* | A* | A* | A* | A* | A** | A** | A* | A* | A* |
| single or inner layer operating conditions: | | | | | | | | | | |
| temperature range (°C.) | 99 to | 99 to | 99 to | 99 to | 99 to | 104 to | 104 to | 99 to | 100 to | 99 to |

TABLE-continued

|  | | | | | | | | | | |
|---|---|---|---|---|---|---|---|---|---|---|
|  | 118 | 119 | 118 | 118 | 118 | 118 | 118 | 119 | 120 | 119 |
| revolutions per minute | 14 | 14 | 14 | 14 | 14 | 13 | 13 | 15 | 15 | 14 |
| feet per minute | 20 | 10 | 33 | 33 | 33 | 27 | 27 | 33 | 33 | 33 |
| melt temperature (°C.) | 133 | 133 | 132 | 132 | 131 | 134 | 134 | 137 | 137 | 134 |
| minimum | 0.098 | 0.145 | 0.078 | 0.086 | 0.091 | — | — | — | — | — |
| maximum | 0.113 | 0.158 | 0.083 | 0.088 | 0.094 | — | — | — | — | — |
| outer layer operating conditions: | | | | | | | | | | |
| temperature range (°C.) | — | — | 99 to 118 | 99 to 118 | 99 to 119 | — | 107 to 116 | — | 100 to 115 | 100 to 116 |
| revolutions per minute | — | — | 12 | 18 | 24 | — | 18 | — | 24 | 20 |
| melt temperature (°C.) | — | — | 120 | 122 | 123 | — | 121 | — | 123 | 126 |
| outer layer wall(mils) | — | — | 15 to 16 | 22 to 24 | 33 to 36 | — | — | — | — | — |
| melt fracture: | | | | | | | | | | |
| single or inner layer | 1 | 1 | 9 | 9 | 9 | 1 | — | 1 | — | 1 |
| outer layer (composite) | — | — | 9 | 9 | 9 | 1 | 9 | — | 9 | — |

| example | 21 | 22 | 23 | 24 | 25 | 26 | 27 | 28 | 29 | 30 |
|---|---|---|---|---|---|---|---|---|---|---|
| single layer polymer | A | A | A | A | A | B | B | B | B | B |
| processing aid | — | — | — | B (500 ppm A) | B (500 ppm A) | — | — | — | — | — |
| single layer operating conditions: | | | | | | | | | | |
| temperature range (°C.) | 99 to 119 | 99 to 119 | 99 to 118 | 99 to 118 | 99 to 118 | 99 to 119 | 99 to 119 | 99 to 119 | 99 to 119 | 99 to 118 |
| revolutions per minute | 14 | 14 | 14 | 14 | 16 | 18 | 24 | 30 | 12 | 13 |
| feet per minute | 33 | 20 | 10 | 10 | 33 | 33 | 33 | 33 | 33 | 33 |
| melt temperature (°C.) | 134 | 136 | 136 | 137 | 137 | 132 | 135 | 138 | 129 | 129 |
| extrudate wall thickness (inch): | | | | | | | | | | |
| minimum | 0.058 | 0.105 | 0.153 | 0.153 | 0.094 | 0.083 | 0.097 | 0.111 | 0.059 | 0.065 |
| maximum | 0.123 | 0.123 | 0.168 | 0.166 | 0.113 | 0.084 | 0.100 | 0.116 | 0.064 | 0.069 |
| melt fracture: | | | | | | | | | | |
| single layer | 1 | 2 | 5 | 5 | 1 | 5 | 5 | 5 | 6 | 6 |

| example | 31 | 32 | 33 | 34 | 35 | 36 | 37 | 38 | 39 |
|---|---|---|---|---|---|---|---|---|---|
| single or inner layer polymer (*) or formulation (**) | B* | B* | B* | B* | B* | C** | C** | C** | C** |
| processing aid | — | B (500 ppm A) | — | B (500 ppm A) | — | — | — | — | — |
| single or inner layer operating conditions: | | | | | | | | | |
| temperature | 99 | 99 | 99 | 99 | 99 | 116 | 116 | 116 | 116 |

TABLE-continued

| | | | | | | | | | |
|---|---|---|---|---|---|---|---|---|---|
| range (°C.) | to 118 | to 118 | to 119 | to 119 | to 119 | to 127 | to 127 | to 124 | to 124 |
| revolutions per minute | 14 | 14 | 14 | 14 | 14 | 12 | 12 | 12 | 12 |
| feet per minute | 33 | 33 | 20 | 10 | 33 | 33 | 33 | 33 | 33 |
| melt temperature (°C.) | 129 | 129 | 129 | 129 | 127 | 131 | 131 | 131 | 131 |
| extrudate wall thickness (inch): | | | | | | | | | |
| minimum | 0.069 | 0.067 | 0.094 | 0.128 | 0.090 | 0.078 | 0.101 | 0.088 | 0.096 |
| maximum | 0.074 | 0.072 | 0.096 | 0.136 | 0.093 | 0.078 | 0.077 | — | — |
| outer layer formulation | — | — | — | — | F | — | F | — | D |
| outer layer operating conditions: | | | | | | | | | |
| temperature range (°C.) | — | — | — | — | 99 to 119 | — | 93 to 116 | — | 107 to 118 |
| revolutions per minute | — | — | — | — | 24 | — | 22 | — | 24 |
| melt temperature (°C.) | — | — | — | — | 127 | — | 123 | — | 121 |
| melt fracture: | | | | | | | | | |
| single inner layer | 6 | 6 | 7 | 8 | 9 | 9 | — | 9 | — |
| outer layer (composite) | — | — | — | — | 9 | — | 9 | — | 9 |

Notes to Table:
1. Examples 1 to 12 attempt to avoid melt fracture with respect to Polymer A by varying process conditions such as temperatures, revolutions per minute, and feet per minute, while operating below 160 degrees C., without success.
2. Examples 13 to 15 co-extrude Formulation F over Polymer A under conditions similar to examples 1 to 12. This essentially eliminates melt fracture both in the inner layer and the outer layer (composite).
3. Examples 16 and 17 use the same inner layer conditions. In example 17, however, there is a co-extrusion of Formulation D over Formulation A. Example 16 results in severely gross melt fracture while the outer layer (or composite) of example 17 is essentially free of melt fracture.
4. Example 18 is similar in result to examples 1 to 12 and 16. Example 19 is a co-extrusion of Formulation E over Polymer A, and the outer layer (or composite) is essentially free of melt fracture.
5. Example 20 is a co-extrusion of Polymer A over Polymer A. The result is severely gross melt fracture.
6. Examples 21 to 23 are similar in result to examples 1 to 12, 16, and 18. Examples 24 and 25 use a processing aid with little or no improvement.
7. Examples 26 to 30 use Polymer B, which is similar to Polymer A, but with a higher melt index. There is some improvement in melt fracture, but the result is still far from commercial acceptability.
8. Example 31 is similar in result to examples 26 to 30. Examples 32 to 34 use processing aids with some improvement with example 34 showing minor, but acceptable melt fracture. Example 35 is a co-extrusion of Formulation F over Polymer B, and there is essentially no melt fracture in the inner or outer layers.
9. Examples 36 and 38 use heterogeneous Polymer C in Formulation C without co-extrusion and the result is essentially no melt fracture. Example 37 co-extrudes Formulation F over Formulation C and example 39 co-extrudes Formulation D over Formulation C. The result is, again, essentially no melt fracture.
10. In examples 13 to 15, 17, 19, 20, 35, 37, and 39 where outer layer temperature ranges are given, flange, head, and die temperatures are not recorded.

We claim:
1. A process for the co-extrusion of an inner layer around a conductive medium and an outer layer around the inner layer comprising:
(i) introducing into an extruder adapted for profile co-extrusion, a preformed conductive medium; an inner layer formulation comprising a homogeneous polyethylene having a polydispersity in the range of about 1.5 to about 3.5 and an essentially uniform comonomer distribution, and an organic peroxide; and an outer layer formulation comprising (A) one of (a) a copolymer of ethylene and an unsaturated ester; or (b) a polyethylene having a polydispersity greater than about 4.0 and a density of at least 0.916 gram per cubic centimeter, said polymer made by a high pressure process; or (c) a heterogeneous copolymer of ethylene and one or more alpha-olefins having a density of less than 0.916 gram per cubic centimeter, a melt index of at least about 4 grams per 10 minutes, and a polydispersity greater than about 4.0, and (B) optionally, an organic peroxide; and

(ii) co-extruding said formulations around the conductive medium at a temperature no higher than about 160 degrees C.

2. The process defined in claim 1 wherein the homogeneous polyethylene is made with a metallocene catalyst.

3. The process defined in claim 2 wherein the homogeneous polyethylene is a copolymer of ethylene, one or more alpha-olefins, each having 3 to 8 carbon atoms, and, optionally, a diene, and has a melt index in the range of about 0.5 to about 30 grams per 10 minutes.

4. The process defined in claim 1 wherein the outer layer polymer is a copolymer of ethylene and vinyl acetate or a methyl or ethyl acrylate or methacrylate wherein the unsaturated ester is present in an amount of about 15 to about 38 percent by weight based on the weight of the copolymer, or an ethylene homopolymer.

5. A process for the co-extrusion of an inner layer around a conductive medium and an outer layer around the inner layer comprising:

(i) introducing into an extruder adapted for profile co-extrusion, a preformed conductive medium; an inner layer formulation comprising a homogeneous copolymer of ethylene, one or more alpha-olefins, each having 3 to 8 carbon atoms, and, optionally, a diene, said copolymer having been made with a metallocene catalyst, and having a polydispersity in the range of about 1.5 to about 3.5, an essentially uniform comonomer distribution, and a melt index in the range of about 0.5 to about 30 grams per 10 minutes, and an organic peroxide; and an outer layer formulation comprising one of (a) a copolymer of ethylene and vinyl acetate or a methyl or ethyl acrylate or methacrylate wherein the unsaturated ester is present in an amount of about 15 to about 38 percent by weight based on the weight of the copolymer; or (b) an ethylene homopolymer having a polydispersity greater than about 4.5 and a density of at least 0.916 gram per cubic centimeter, said polymer made by a high pressure process; or (c) a heterogeneous copolymer of ethylene and one or more alpha-olefins, each alpha-olefin having 3 to 8 carbon atoms, said copolymer having a density of less than 0.916 gram per cubic centimeter, a melt index of at least about 4 grams per 10 minutes, and a polydispersity greater than about 4.5; and (ii) co-extruding said formulations around the conductive medium at a temperature no higher than about 160 degrees C.

6. The process defined in claim 5 wherein the outer layer formulation contains an organic peroxide.

* * * * *